(12) United States Patent
Kukla et al.

(10) Patent No.: US 10,618,198 B2
(45) Date of Patent: Apr. 14, 2020

(54) DEVICE AND METHOD FOR FOAMING A VISCOUS MATERIAL

(71) Applicant: CERACON GMBH, Weikersheim (DE)

(72) Inventors: Frank Kukla, Würzburg (DE); Erich Krämer, Röttingen (DE)

(73) Assignee: CERACON GMBH, Weikersheim (DE)

( * ) Notice: Subject to any disclaimer, the term of this patent is extended or adjusted under 35 U.S.C. 154(b) by 0 days.

(21) Appl. No.: 16/096,572

(22) PCT Filed: Jun. 28, 2017

(86) PCT No.: PCT/EP2017/066042
§ 371 (c)(1),
(2) Date: Oct. 25, 2018

(87) PCT Pub. No.: WO2018/028876
PCT Pub. Date: Feb. 15, 2018

(65) Prior Publication Data
US 2019/0337189 A1    Nov. 7, 2019

(30) Foreign Application Priority Data
Aug. 11, 2016    (DE) .................. 10 2016 114 898

(51) Int. Cl.
*B29B 7/72*    (2006.01)
*B05B 7/00*    (2006.01)
(Continued)

(52) U.S. Cl.
CPC ............ *B29B 7/726* (2013.01); *B05B 7/0043* (2013.01); *B05B 7/12* (2013.01); *B05B 9/0406* (2013.01);
(Continued)

(58) Field of Classification Search
CPC ..... B29B 7/726; B29B 7/7433; B29B 7/7485; B29B 7/86; B29B 7/40; B29B 7/7423;
(Continued)

(56) References Cited

U.S. PATENT DOCUMENTS 4,779,762 A * 10/1988 Klein ...................... B05B 7/262
137/4
6,127,422 A    10/2000 Sulzbach
(Continued)

FOREIGN PATENT DOCUMENTS

CN    103895146 A    7/2014
DE    133642 A1    1/1979
(Continued)

OTHER PUBLICATIONS

EPO Machine Translation for JPH 05 123555, 18 pages. (Year: 2019).*
(Continued)

*Primary Examiner* — Tony G Soohoo
(74) *Attorney, Agent, or Firm* — King & Schickli, PLLC

(57) ABSTRACT

The invention relates to a device (01, 19, 23) for foaming a viscous material (02), said viscous material (02) being conveyed through a first conveyor pipe (05) using a first conveying means (04) at a first conveying pressure, and a gas (07) being conveyed through a second conveyor pipe (08) at a second conveying pressure, and the second conveyor pipe (08) and the first conveyor pipe (05) becoming conjoined at an opening (15), and a discharge device (17) being provided downstream of the opening (15) so as to allow a pressure-relieving discharge of the mixture (14) made up of viscous material (02) and gas (07), a gas injection valve (09) being arranged at the opening (15), said gas injection valve (09) allowing to inject gas bubbles (25) into the viscous material (02).

24 Claims, 3 Drawing Sheets

(51) Int. Cl.
  B05B 7/12 (2006.01)
  B05B 9/04 (2006.01)
  B05B 12/08 (2006.01)
  B29B 7/40 (2006.01)
  B29B 7/74 (2006.01)
  B29B 7/80 (2006.01)
  B29B 7/86 (2006.01)
  B29K 105/04 (2006.01)

(52) U.S. Cl.
  CPC .......... *B05B 9/0413* (2013.01); *B05B 12/085* (2013.01); *B29B 7/40* (2013.01); *B29B 7/7423* (2013.01); *B29B 7/7428* (2013.01); *B29B 7/7433* (2013.01); *B29B 7/7461* (2013.01); *B29B 7/7485* (2013.01); *B29B 7/801* (2013.01); *B29B 7/86* (2013.01); *B29K 2105/04* (2013.01)

(58) Field of Classification Search
  CPC ... B29B 7/801; B29B 7/7461; B29B 2105/04; B29B 7/7428; B05B 9/0413; B05B 9/0406; B05B 12/085; B05B 7/12; B05B 7/0043
  See application file for complete search history.

(56) References Cited

U.S. PATENT DOCUMENTS

| | | |
|---|---|---|
| 2006/0293401 A1 | 12/2006 | Porter |
| 2009/0236025 A1 | 9/2009 | Burkus et al. |
| 2013/0215710 A1 | 8/2013 | Hepperle et al. |
| 2015/0306552 A1 | 10/2015 | Erban |

FOREIGN PATENT DOCUMENTS

| | | |
|---|---|---|
| DE | 69827938 T2 | 5/2005 |
| DE | 102010039700 A1 | 3/2012 |
| DE | 102012209517 B3 | 11/2013 |
| EP | 0259689 A1 | 3/1988 |
| EP | 0286015 A2 | 10/1988 |
| EP | 0723843 A2 | 7/1996 |
| EP | 0974391 A1 | 1/2000 |
| EP | 3310543 A1 | 4/2018 |
| JP | S57144732 A | 9/1982 |
| JP | H05123555 A | 5/1993 |
| JP | H10272344 A | 10/1998 |
| JP | 2006289276 A | 10/2006 |
| JP | 2016078304 A | 5/2016 |
| WO | 9747453 A1 | 12/1997 |
| WO | 2016125900 A1 | 8/2016 |

OTHER PUBLICATIONS

EPO Machine Translation for DE 4037665, 5 pages. (Year: 2019).*
Machine translation for JPS 57144732, 7 pages. (Year: 2019).*
English Machine Translation of WO9747453A1 dated Dec. 18, 1997.
English Machine Translation of DE102012209517B3 dated Nov. 7, 2013.
Brooks Instrument, Model 5850E Mass Flow Controller Installation and Operation Manuel (X-TMF-5850E-MFC-eng—Part No. 54113102AAG, Sep. 2009,www.Brooksinstrument.com.

* cited by examiner

DEVICE AND METHOD FOR FOAMING A VISCOUS MATERIAL

BACKGROUND OF THE INVENTION

The invention relates to a device and a method for foaming a viscous material according to the teachings of the independent claims.

The generically produced foams are used, for example, though by no means exclusively, to apply foamed seals on components to be sealed in freely configurable shapes. Firstly, so-called two-component foams are known for this purpose, in which two components that are chemically reactive with each other are mixed together and yield a foam due to the chemical reaction. A disadvantage of these two-component sealing systems is that the chemical reaction can only be interrupted with great difficulty during process interruptions. For this reason, it is generally required to clean the respective device extensively following process interruptions when using such two-component systems.

In order to avoid these disadvantages of two-component systems, so-called single-component systems are known for foaming viscous materials. EP 0 286 015 B1 describes such a generic method for a single-component system. The basis of this method is the mixing of a viscous material with highly pressurized gas. After the gas has been added to the viscous material, the mixture is thoroughly mixed in a mixing device in order to ensure a sufficiently fine distribution of the gas in the viscous material. Subsequently, the mixture is discharged under high pressure and relieved of pressure upon being discharged. Via the pressure relief, it is achieved that the gas bubbles distributed in the viscous material expand due to the difference in pressure after the pressure has been relieved and consequently physically foam the viscous material. A disadvantage of this method is that the size and the distribution of the gas bubbles in the viscous material correspond to a statistical distribution so that the viscous material can also comprise relatively large gas bubbles besides minuscule gas bubbles, which can lead to irregularities when producing the foam. Due to the statistical distribution of the gas bubbles in terms of quality and quantity, a reliable process control is complicated when producing the desired foam.

SUMMARY OF THE INVENTION

The object of the present invention is therefore to propose a new device and a new method for foaming a viscous material by means of which the process reliability is enhanced when producing the foam. This object is attained by a device and a method according to the teachings of the independent claims.

The device according to the invention is based upon the fundamental idea that the gas, which is to be injected into the viscous material, is injected into the viscous material by means of a gas injection valve. The quality and quantity of the gas bubbles can be reliably controlled owing to the injection of the gas bubbles when using a gas injection valve. The deviation in size and distribution of the gas bubbles is within a very narrow range owing to the targeted injection of the gas when using the gas injection valve so that a high-quality foam having very uniform material properties can be produced.

Depending on the number of gas injection valves and on the cross section of the first conveyor pipe, in which the viscous material flows when the gas bubbles are injected, it can be sufficient, according to the basic shape of the device according to the invention, for the gas bubbles to be distributed in the viscous material solely by the gas injection. In order to distribute the gas bubbles even more homogenously and to also divide the injected gas bubbles into even smaller gas bubbles, a statically or dynamically functioning mixing device can be used which is arranged downstream of the opening at which the gas bubbles are injected. By mixing the injected gas bubbles into the viscous material, the material is homogenized and a distribution of the injected gas bubbles is attained depending on the chosen mixing method. For this purpose, static mixers can be used which do not carry out any mixing movement themselves. In these static mixers, the viscous material is mixed by the flowing movement of the viscous material past respective flow guiding elements. The gas bubbles can be more thoroughly homogenized in the viscous material using dynamic mixers in which the mixture made up of gas bubbles and viscous material is mixed by actively driving a mixing element. In particular shear mixers are very well suited for mixing the injected gas bubbles into the viscous material since the gas bubbles are distributed particularly finely via the shear forces exerted in the shear mixer. For this purpose, the shear mixer can consist of a rotating shaft having mixing blades or mixing disks fixed thereto.

The mixture made up of viscous material and the injected gas bubbles has to be relieved of pressure at the discharge device in order to foam the gas bubbles. Should the pressure be relieved by, for example, applying the mixture made up of viscous material and gas bubbles onto a workpiece at standard atmosphere by means of the discharge device, the pressure of the viscous material with gas bubbles injected therein has to be distinctly above the standard pressure of 1 bar upstream of the discharge device. In order to enable a good foaming effect, the pressure of the mixture made up of viscous material and injected gas bubbles should be distinctly above the standard pressure of 1 bar. It has therefore proven to be particularly advantageous to work in the high-pressure range and to inject the gas bubbles at high pressure into the already highly pressurized viscous material. It is therefore particularly advantageous if the conveying means convey the viscous material to the opening at a conveying pressure of at least 50 bar, in particular at a conveying pressure of at least 80 bar, through the first conveyor pipe.

In the already highly pressurized viscous material, the gas can then be conveyed to the gas injection valve at a conveying pressure of at least 55 bar, in particular of at least 90 bar, through the second conveyor pipe and can be injected into the already highly pressurized viscous material. In this context, it is to be observed that during gas injection a sufficient difference in pressure in the range of 1 bar to 20 bar must be present between the already highly pressurized viscous material and the gas to be injected therein. Therefore, if the viscous material is conveyed to the opening at a conveying pressure of 50 bar, for example, the gas to be injected therein must have a pressure of at least 51 bar. A larger difference in pressure is more advantageous in this context so that the gas to be injected should have a pressure of 110 bar, for example, when a conveying pressure of the viscous material is 100 bar, for example.

What kind of gas injection valve is used for injecting the gas bubbles into the viscous material is generally arbitrary. According to a preferred embodiment, it is intended for the gas injection valve to have a needle valve.

It is particularly advantageous if the needle valve of the gas injection valve allows adjusting the stroke of the needle valve in order to be able to change the size of the injected gas bubbles.

Furthermore, it is particularly advantageous if the movement frequency of the needle valve can be changed in order to be able to vary the amount of the injected gas bubbles per time by changing the frequency of the needle strokes.

In order to be able to monitor the injection process of the device according to the invention, suitable pressure sensors should be provided on the device. The pressure of the viscous material should be able to be monitored upstream of the opening by means of a first pressure sensor. Alternatively or additionally thereto, it is further particularly advantageous if the pressure in the gas is measured upstream of the gas injection valve using a second pressure sensor. Also alternatively or additionally thereto, it is further particularly advantageous if the pressure in the mixture made up of viscous material and gas bubbles can be measured downstream of the gas injection valve using a third pressure sensor.

In regard of an optimized process reliability, it is particularly advantageous if a control loop is provided on the device for controlling the gas bubble flow flowing into the viscous material at the opening by controlling the gas injection valve as a function of a measurement measured using a sensor. In other words, this means that the gas injection valve serves as a control element in the control loop and the control of the gas injection valve is changed according to a predetermined control strategy as a function of a sensor provided in the control loop. The pressure of the viscous material upstream of the opening and the pressure of the gas upstream of the gas injection valve can be measured, for example, and the setting parameters of the gas injection valve can be controlled as a function of these two sensor values according to a predetermined control strategy.

In order to be able to evenly discharge the mixture made up of the viscous material and gas bubbles from the discharge device, it is particularly advantageous if at least one conveyor pump is provided downstream of the opening, the pressurized mixture being able to be conveyed to the discharge device by means of the at least one conveyor pump. A piston pump can be used as a conveyor pump, for example.

In particular when using piston pumps as conveyor pumps for conveying the mixture made up of viscous material and gas bubbles to the discharge device, it is particularly advantageous if not only one but at least two conveyor pumps are provided in parallel pipe sections downstream of the opening. By means of the two conveyor pumps arranged parallel to each other the pressurized mixture made up of viscous material and gas bubbles can be alternately conveyed to the discharge device so that the conveying flow is not stalled but rather the mixture is evenly conveyed to the discharge device in particular when the end position of a piston pump is reached.

Needle valve nozzles have proven particularly suitable for being used as discharge devices in the device according to the invention. These needle valve nozzles should preferably be driven pneumatically. Such needle valve nozzles enable a reliable and controlled dosing of the mixture made up of viscous material and gas bubbles.

The method according to the invention is characterized in that the gas being pressurized at a conveying pressure is injected into the viscous material being pressurized at a conveying pressure by means of a gas injection valve. The mixture made up of viscous material and gas bubbles thus produced is then discharged at a discharge device downstream of the opening, thus relieving pressure, so that owing to the pressure relief the viscous material is foamed by expansion of the gas bubbles mixed therein.

In order to enhance the uniform distribution of the gas bubbles in the viscous material, it is advantageous if the mixture made up of viscous material and gas bubbles is homogenized using a mixing device after injecting the gas bubbles and prior to being discharged.

The conveying pressure of the viscous material towards the opening, where the gas bubbles are injected by means of the gas injection valve, should preferably be above 50 bar in order to enable high-pressure processing. It is particularly advantageous if the conveying pressure of the viscous material towards the opening is above 80 bar, for example 100 bar.

The gas injected into the viscous material should also be highly pressurized, the gas pressure having to be at least slightly higher than the conveying pressure of the viscous material since a gas injection would not be possible otherwise. A high-pressure processing has proven particularly suitable, in which the gas has a conveying pressure of at least 55 bar, in particular a conveying pressure of at least 90 bar.

The difference in pressure between the conveying pressure of the viscous material on the one hand and the conveying pressure of the gas on the other hand should be at least 1 bar in order to enable a reliable injection of the gas bubbles into the viscous material.

In regard of a reliable control of the injection process, it is particularly advantageous if the size of the gas bubbles can be changed while the gas bubbles are being injected. This can be achieved by changing the stroke of a needle valve in the gas injection valve, for example. Alternatively or additionally thereto, the size of the gas bubbles can be changed during injection of the gas bubbles by changing the difference in pressure between the first conveying pressure in the viscous material and the second conveying pressure in the gas.

Furthermore, it is particularly advantageous if the amount of gas bubbles per time can be changed during injection of the gas bubbles. This can be achieved by changing the stroke frequency of the needle valve in a gas injection valve, for example.

The highest level of process reliability when producing the desired foam is achieved when the injection of the gas bubbles using the gas injection valve is changed in a control loop as a function of at least one measurement measured using a sensor.

For this purpose, sensors can be used which measure the pressure in the viscous material and/or which measure the pressure in the gas and/or which measure the pressure in the mixture made up of viscous material and gas.

What kind of viscous material is used for the method according to the method is generally arbitrary and depends on the requirements of the material to be foamed. In regard of the processability, it is particularly advantageous if the gas bubbles are injected at a pressure of at least 50 bar, in particular at a pressure of at least 80 bar, by means of the gas injection valve, a hardener paste material of the single-component type being used as a viscous material. At a temperature of 20° C., the hardener paste material should have a viscosity characteristic which is within a zone defined by the points A, B, C and D. Point A of the preferable viscosity zone has a perceived viscosity of 5 Pa·s at a shear rate of $0.43 \text{ s}^{-1}$. Point B has a perceived viscosity of 3,000 Pa·s at a shear rate of $0.43 \text{ s}^{-1}$. Point C has a perceived viscosity of 2 Pa·s at a shear rate of $783 \text{ s}^{-1}$ and point D has a perceived viscosity of 200 Pa·s at a shear rate of 783 s⁻¹. The indicated viscosity values can be determined according to the requirements of DIN EN ISO 3219.

Different embodiments of the invention are schematically illustrated in the drawings and are described in the following in an exemplary manner.

BRIEF DESCRIPTION OF THE DRAWING FIGURES

DETAILED DESCRIPTION OF THE INVENTION

Figure 1:
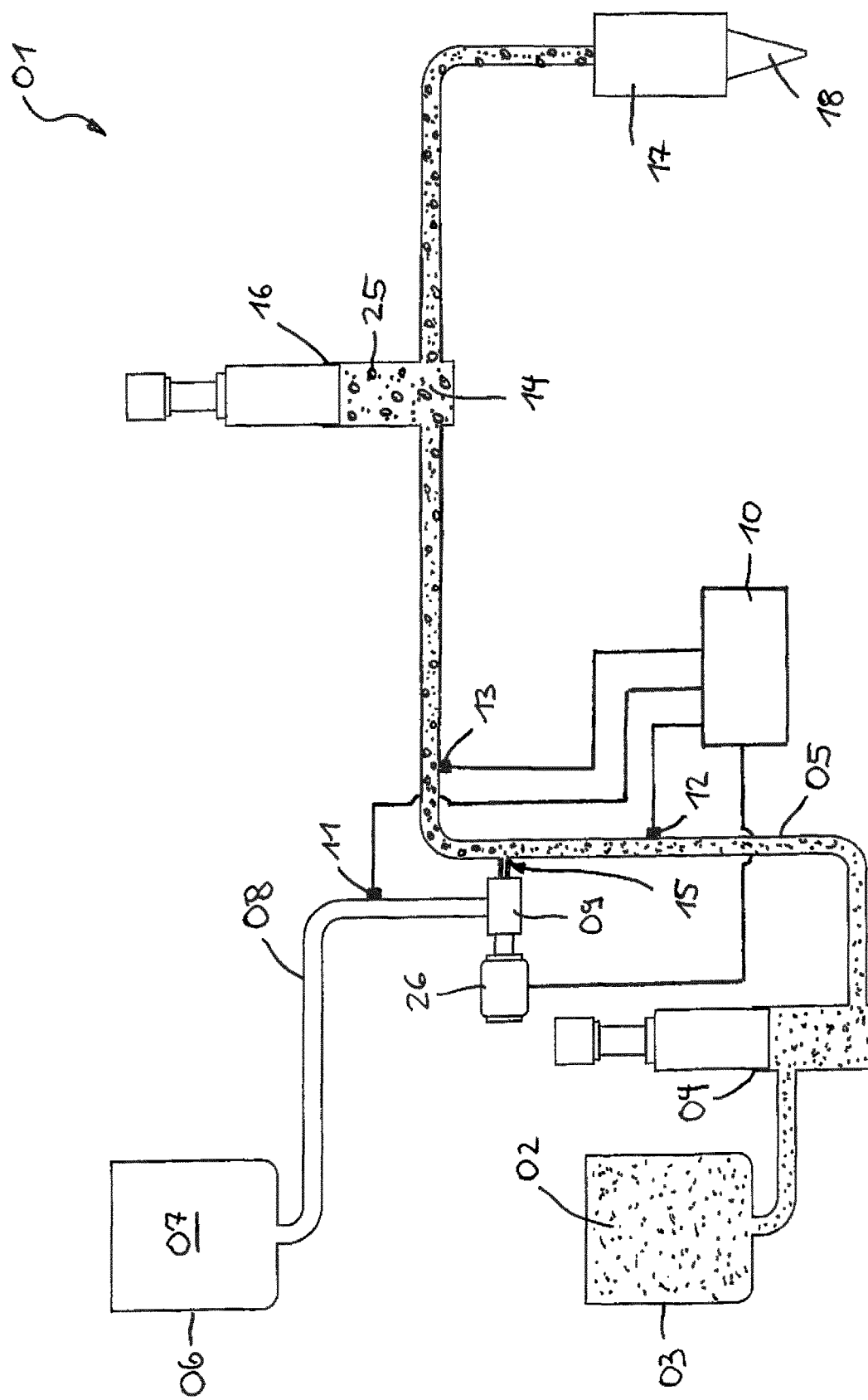
FIG. 1 illustrates a first embodiment of a device according to the invention in a schematic diagram.

FIG. 1 schematically illustrates a first device 01 according to the invention for foaming a viscous material. The viscous material 02 is pumped from a container 03 through a first conveyor pipe 05 using a conveying means 04, namely a piston pump. The viscous material 02 is pressurized in the conveyor pipe 05 at a pressure of 100+/−20 bar.

A gas 07, for example air, is present in a container 06. The gas 07 is highly pressurized by means of a high pressure compressor (not illustrated) at a pressure of 110+/−20 bar, for example. The gas pressure of the gas 07 is chosen such in each instance that the gas pressure is at least slightly larger than the conveying pressure of the viscous material 02 in the conveyor pipe 05. The gas 07 reaches a gas injection valve 09 having a needle valve via a second conveyor pipe 08. The needle valve of the gas injection valve is controlled via a control device 10 in a regulated manner for this purpose. In a control loop, the control device 10 evaluates the measurements of the sensors 11, 12 and 13 by means of which the pressure of the gas 07 in the second conveyor pipe 08 and/or the pressure of the viscous material 02 in the conveyor pipe 05 and/or the pressure of the mixture 14 can be measured, respectively. Depending on these measurements, the drive 26 of the needle valve in the gas injection valve 09 is controlled by the control device 10 in order to control the gas injection process according to the predetermined target values.

Via gas injection, gas bubbles 25 in a defined size and amount are injected into the viscous material 02 at the opening 15, at which the second conveyor pipe 08 and the first conveyor pipe 05 become conjoined, by operating the gas injection valve 09 in order to thus produce the mixture 14 made up of gas bubbles 25 and viscous material 02. In the drawings, the gas bubbles are illustrated disproportionally large in order to facilitate understanding the invention.

By operating a conveyor pump 16, the mixture made up of viscous material 02 and gas bubbles 25 is conveyed to a discharge device 17 having a pneumatically driven needle valve nozzle 18 where the mixture is dosed while relieving pressure and can be applied to a workpiece. The dosed mixture 14 foams up after being discharged from the needle valve nozzle 18 since the gas bubbles 25 contained in the mixture 14 grossly expand at standard atmosphere owing to the pressure relief.

Figure 2:
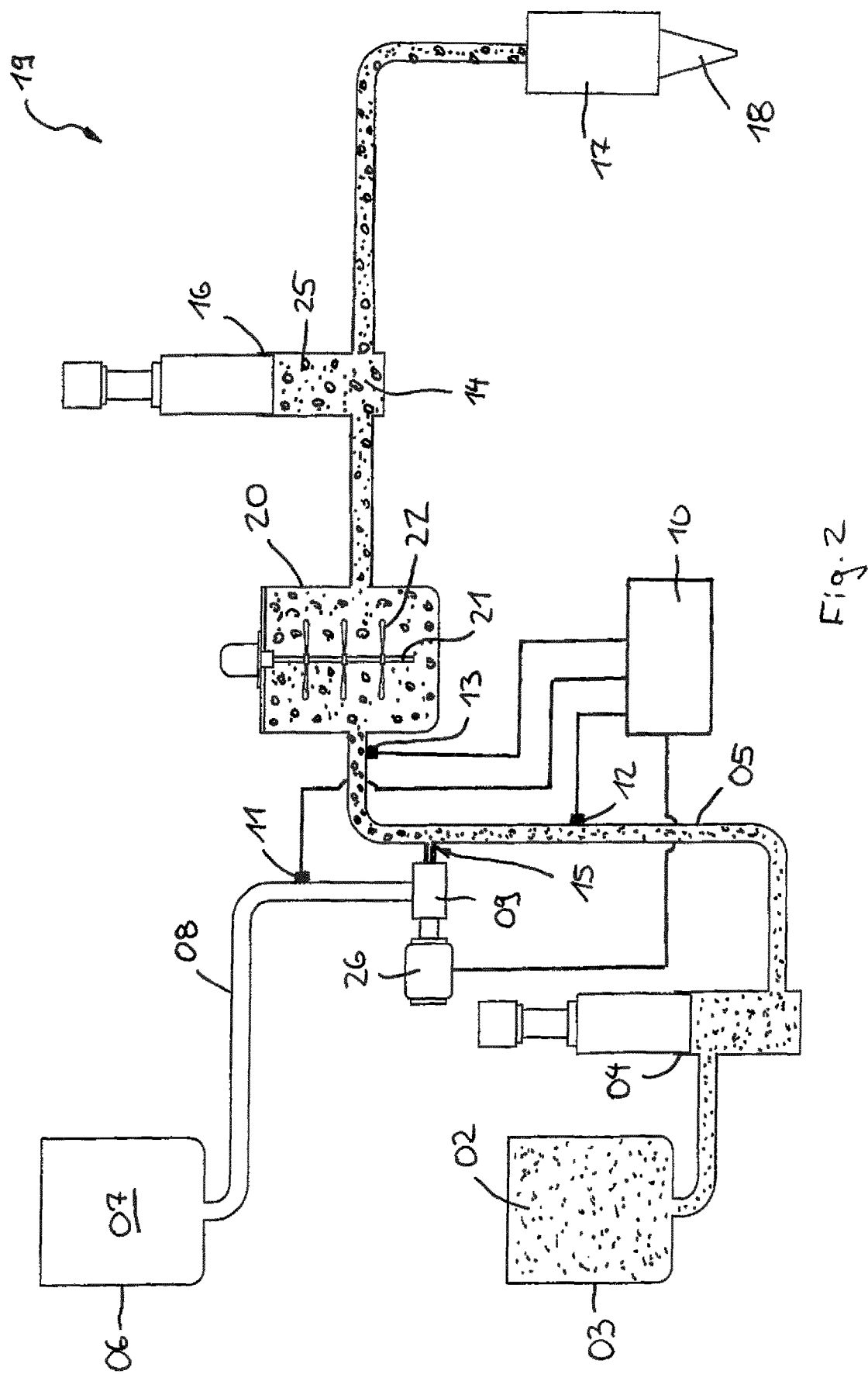
FIG. 2 illustrates a second embodiment of a device according to the invention in a schematic diagram.

FIG. 2 illustrates a second device 19 for foaming the viscous material 02 which largely corresponds to device 01. Additionally to device 01, device 19 comprises a mixing device 20, which is arranged downstream of the opening 15, in order to homogenize the mixture 14 made up of viscous material 02 and the gas bubbles 25 injected therein and to reduce the gas bubbles 25 in size. For this purpose, the mixing device 20 comprises a drive shaft 21 by means of which the mixing blades 22 are rotationally driven. In this context, the mixture 14 flows into the mixing device 20 parallel to the rotational plane of the mixing blades 22.

Figure 3:
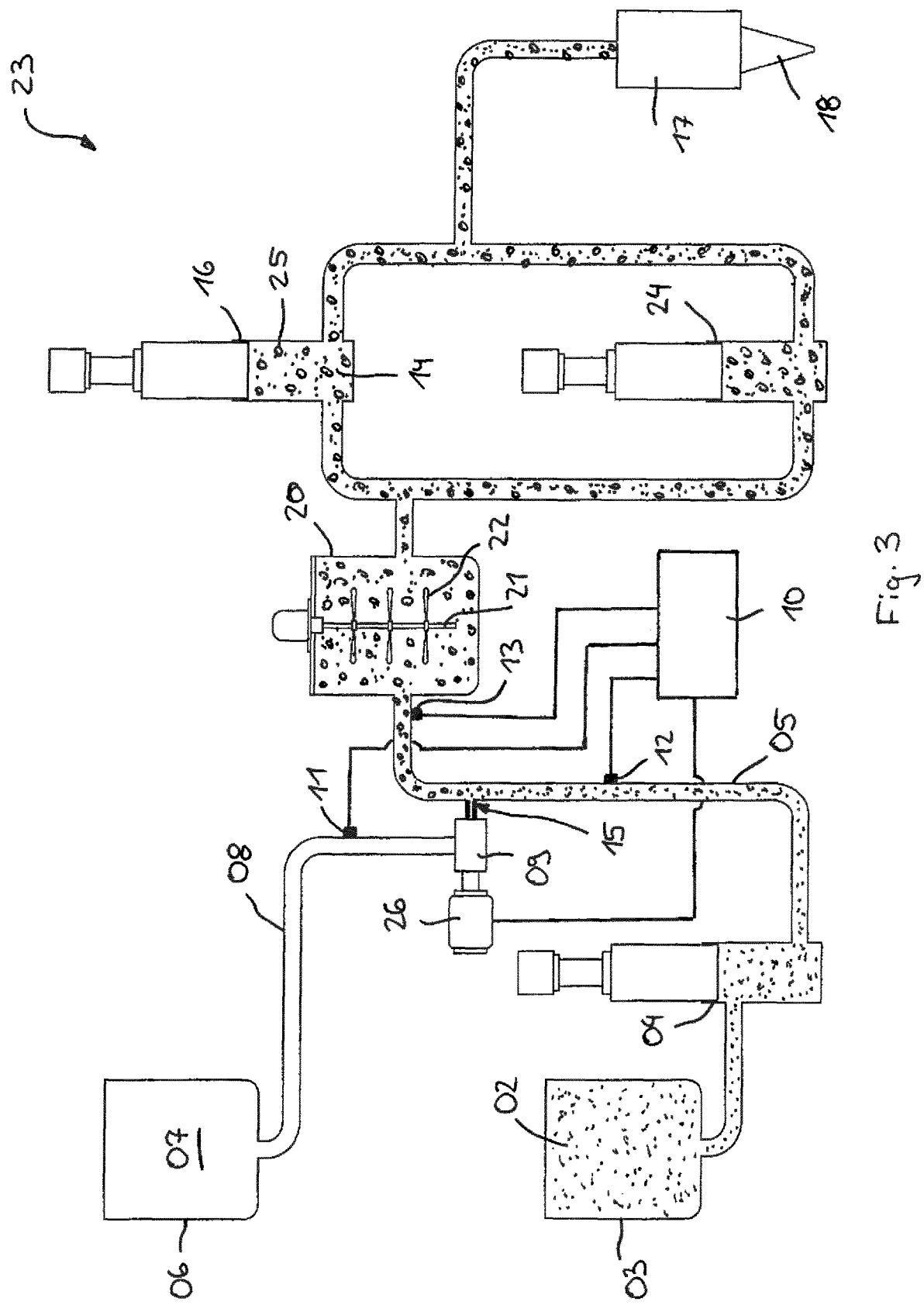
FIG. 3 illustrates a third embodiment of a device according to the invention in a schematic diagram.

FIG. 3 illustrates a device 23 for foaming the viscous material 02, which largely corresponds to device 19. Additionally to device 19, device 23 comprises a second conveyor pump 24 so that the conveyor pumps 16 and 24 are each arranged in pipe sections extending parallel to each other. By alternately operating the conveyor pumps 16 and 24, the mixture made up of viscous material 02 having the gas bubbles 25 injected therein can be conveyed to the discharge device 17 without any interruption.

The invention claimed is:

1. A device (01, 19, 23) for foaming a viscous material (02), said viscous material (02) being conveyed through a first conveyor pipe (05) using a first conveying means (04) at a first conveying pressure, and a gas (07) being conveyed through a second conveyor pipe (08) at a second conveying pressure, and the second conveyor pipe (08) and the first conveyor pipe (05) becoming conjoined at an opening (15), and a discharge device (17) being provided downstream of the opening (15) so as to allow a pressure-relieving discharge of the mixture (14) made up of viscous material (02) and gas (07), characterized in that a gas injection valve (09) is arranged at the opening (15), said gas injection valve (09) allowing to inject gas bubbles (25) into the viscous material (02); characterized in that the conveying means (04) allows to convey the viscous material to the opening (15) at the first conveying pressure of at least 50 bar through the first conveyor pipe (05).

2. The device according to claim 1, characterized in that a statically or dynamically functioning mixing device (20) is arranged at the opening or downstream of the opening (15) in order to homogenize the mixture (14) made up of viscous material (02) and gas bubbles (25).

3. The device according to claim 1, characterized in that the conveying means (04) allows to convey the viscous material to the opening (15) at the first conveying pressure of at least 80 bar, through the first conveyor pipe (05).

4. The device according to claim 1, characterized in that the gas (07) is allowed to be conveyed to the gas injection valve (09) at the second conveying pressure of at least 55 bar, through the second conveyor pipe (08).

5. The device according to claim 1, characterized in that the gas injection valve (09) comprises a needle valve.

6. The device according to claim 5, characterized in that the size of the injected gas bubbles (25) is allowed to be changed by adjusting the stroke of the needle valve in the gas injection valve (09) and/or by changing the difference in pressure between the first conveying pressure in the viscous material (02) and the second conveying pressure in the gas (07).

7. The device according to claim 5, characterized in that the amount of injected gas bubbles (25) per time is allowed to be changed by changing the movement frequency of the needle valve in the gas injection valve (09).

8. The device according to claim 1, characterized in that the device (01, 19, 23) has a first pressure sensor (12) for measuring the pressure in the viscous material (02) upstream of the opening (15) and/or a second pressure sensor (11) for measuring the pressure in the gas (07) upstream of the gas injection valve (09) and/or a third pressure sensor (13) for measuring the pressure in the mixture (14) made up of viscous material (02) and gas bubbles (25).

9. The device according to claim 1, characterized in that a control device (10) is provided at the device (01, 19, 23), said control device (10) allowing to control the flow of gas bubbles (25) flowing into the viscous material (02) at the opening (15) by controlling the gas injection valve (09) as a function of a measurement measured using a sensor (11, 12, 13).

10. The device according to claim 1, characterized in that at least one conveyor pump (16, 24), by means of which the pressurized mixture (14) made up of viscous material (02) and gas bubbles (25) is allowed to be conveyed to the discharge device (17), is provided downstream of the opening (15).

11. The device according to claim 10, characterized in that two conveyor pumps (16, 24), which allow alternately conveying the pressurized mixture (14) made up of viscous material (02) and gas bubbles (25) to the discharge device (17), are provided downstream of the opening (15) in parallel pipe sections.

12. The device according to claim 1, characterized in that the discharge device (17) has a needle valve nozzle (18) being in particular pneumatically driven, by means of which the pressurized mixture (14) made up of viscous material (02) and gas bubbles (25) is allowed to be dosed in a controlled manner.

13. The device according to claim 1, characterized in that the gas (07) is allowed to be conveyed to the gas injection valve (09) at the second conveying pressure of at least 90 bar through the second conveyor pipe (08).

14. A method for foaming a viscous material (02), said viscous material (02) being conveyed at a first conveying pressure through a first conveyor pipe (05), and a gas (07) being conveyed to an opening (15) at a second conveying pressure through a second conveyor pipe (08), and said gas (07) being injected into the viscous material (02) at the opening (15) in the form of gas bubbles (25) using a gas injection valve (09), and said mixture (14) made up of viscous material (02) and gas bubbles (25) being discharged downstream of the opening (15) at a discharge device (17), thus relieving pressure, and being foamed by expansion of the gas bubbles;
characterized in that the viscous material (02) is conveyed to the opening (15) at the first conveying pressure of at least 50 bar through the first conveyor pipe (05).

15. The method according to claim 14, characterized in that the mixture (14) made up of viscous material (02) and gas bubbles (25) is homogenized before being discharged.

16. The method according to claim 14, characterized in that the viscous material (02) is conveyed to the opening (15) at the first conveying pressure of at least 80 bar, through the first conveyor pipe (05).

17. The method according to claim 14, characterized in that the gas is conveyed to the gas injection valve (09) at the second conveying pressure of at least 55 bar, through the second conveyor pipe (08).

18. The method according to claim 14, characterized in that the gas (07) is injected into the viscous material (02) at an excess pressure of at least 1 bar.

19. The method according to claim 14, characterized in that the size of the gas bubbles (25) is changed while the gas bubbles (25) are injected.

20. The method according to claim 14, characterized in that the amount of gas bubbles (25) per time is changed while the gas bubbles (25) are injected.

21. The method according to claim 14, characterized in that the injection of the gas bubbles (25) using the gas injection valve (09) is controlled in a control loop as a function of at least one measurement measured by a sensor.

22. The method according to claim 21, characterized in that the injection of the gas bubbles (25) using the gas injection valve (09) is controlled in a control loop as a function of the measured pressure in the viscous material (02) and/or as a function of the measured pressure in the gas d(07) and/or as a function of the measured pressure in the mixture (14) made up of viscous material (02) and gas bubbles (25).

23. The method according to claim 14, characterized in that the gas bubbles (25) are injected at a pressure of at least 50 bar, in particular at a pressure of at least 80 bar, using the gas injection valve (09), a hardener paste material of the single-component type being used as a viscous material (02), said hardener paste material having a viscosity characteristic at 20° C. in a zone defined by the points A, B, C and D, point A having a perceived viscosity of 5 Pa·s at a shear rate of 0.43 $s^{-1}$, point B having a perceived viscosity of 3,000 Pa·s at a shear rate of 0.43 $s^{-1}$, point C having a perceived viscosity of 2 Pa·s at a shear rate of 783 $s^{-1}$, and point D having a perceived viscosity of 200 Pa·s at a shear rate of 783 $s^{-1}$.

24. The method according to claim 14, characterized in that the gas is conveyed to the gas injection valve (09) at the second conveying pressure of at least 90 bar through the second conveyor pipe (08).

\* \* \* \* \*